United States Patent
Huth et al.

(10) Patent No.: US 9,308,915 B2
(45) Date of Patent: Apr. 12, 2016

(54) SYSTEM AND METHOD FOR WARNING OF A POSSIBLE COLLISION OF A MOTOR VEHICLE WITH AN OBJECT

(71) Applicant: GM GLOBAL TECHNOLOGY OPERATIONS LLC, Detroit, MI (US)

(72) Inventors: Johannes Huth, Trebur (DE); Markus Armbrust, Wonsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/341,618

(22) Filed: Jul. 25, 2014

(65) Prior Publication Data

US 2015/0032288 A1     Jan. 29, 2015

(30) Foreign Application Priority Data

Jul. 25, 2013   (DE) .................... 20 2013 006 676 U

(51) Int. Cl.
| | |
|---|---|
| G06K 9/00 | (2006.01) |
| B60R 21/01 | (2006.01) |
| B60W 30/09 | (2012.01) |
| B60W 30/08 | (2012.01) |
| G08G 1/16 | (2006.01) |

(52) U.S. Cl.
CPC ............. *B60W 30/09* (2013.01); *B60W 30/08* (2013.01); *G08G 1/16* (2013.01); *G08G 1/165* (2013.01); *G08G 1/166* (2013.01)

(58) Field of Classification Search
USPC .......... 701/28, 301, 45, 70, 96, 300; 340/435; 382/103; 280/734, 735
See application file for complete search history.

(56) References Cited

U.S. PATENT DOCUMENTS

| | | | |
|---|---|---|---|
| 8,150,583 B2 * | 4/2012 | Danner ............... | B60R 21/0134 180/167 |
| 2011/0228980 A1 * | 9/2011 | Ichikawa ............... | H04N 7/181 382/103 |

FOREIGN PATENT DOCUMENTS

| | | |
|---|---|---|
| DE | 10257842 A1 | 11/2003 |
| DE | 10341128 A1 | 3/2005 |
| DE | 102004028613 A1 | 12/2005 |
| DE | 102005023832 A1 | 11/2006 |
| DE | 102010002105 A1 | 8/2011 |
| DE | 102011010864 A1 | 12/2011 |

* cited by examiner

Primary Examiner — Adam Tissot
(74) Attorney, Agent, or Firm — Ingrassia Fisher & Lorenz PC

(57) ABSTRACT

A system and method for warning of a possible collision of a motor vehicle with an object is disclosed. The system includes sensors configured to monitor a driving path of the motor vehicle, and a warning unit configured to initiate a safety-related action when an object has been detected within the monitored driving path. A control unit dynamically adapts the monitored driving path or driving envelope as a function of vehicle parameters and/or environmental parameters. A method for warning of a possible collision of a motor vehicle with an object in accordance with this system is also disclosed.

11 Claims, 2 Drawing Sheets

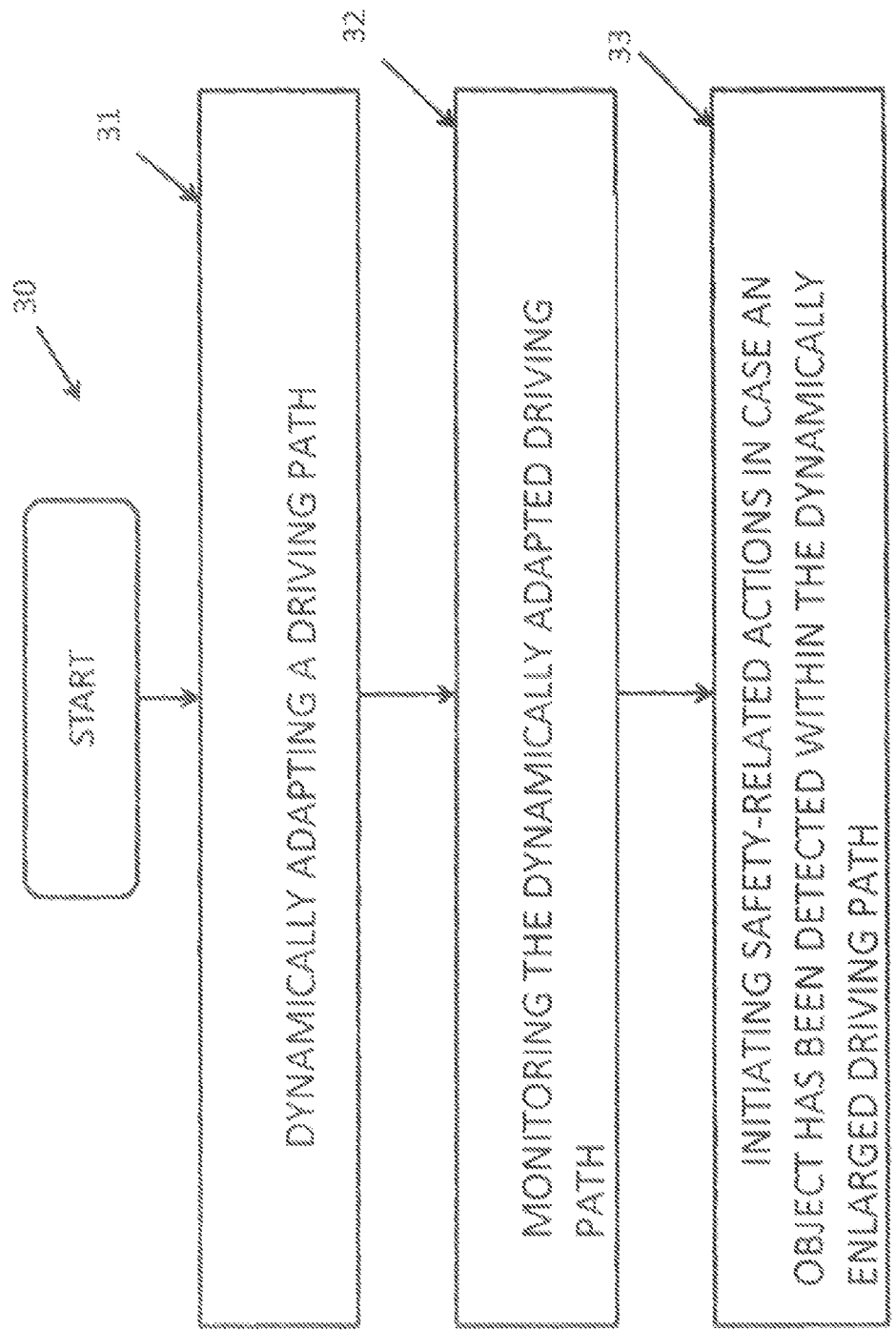

SYSTEM AND METHOD FOR WARNING OF A POSSIBLE COLLISION OF A MOTOR VEHICLE WITH AN OBJECT

CROSS REFERENCE TO RELATED APPLICATION

This application claims priority to German Patent Application No. 202013006676.8 filed Jul. 25, 2013, which is incorporated herein by reference in its entirety.

TECHNICAL FIELD

The present disclosure relates to a system and method for warning of a possible collision of a motor vehicle with an object such as a pedestrian based on predictive trajectories of the motor vehicle and the object such that a safety-related action can be initiated when the object is outside an immediate surrounding area of the motor vehicle.

BACKGROUND

DE 10 2011 010 864 A1 discloses a system for predicting collisions between a motor vehicle and objects in an environment of the motor vehicle, which includes a dead angle area of the motor vehicle. The system is configured to define probable dwelling areas around the vehicle for the vehicle and other objects, and to determine their overlapping probability. There is a continuing need in the art to provide a system for warning of a possible collision of a motor vehicle with an object which leads to increased traffic safety.

SUMMARY

According to one embodiment of the present disclosure a system for warning of a possible collision of a motor vehicle with an object is provided, which includes sensors for monitoring a driving path of the motor vehicle, and a warning unit for initiating a safety-related action in case an object has been detected within the monitored driving path. Further, the system includes a control unit for dynamically adapting the monitored driving path in dependence or as a function of vehicle parameters and/or environmental parameters.

In concept, a reaction range of the system is dynamically adapted for warning of a possible collision of a motor vehicle with an object, and may be enlarged beyond the physical vehicle width. The driving path is understood to be, in particular, the roadway on which the motor vehicle is anticipated to travel. The object is understood to be a pedestrian, in particular. But the system can also be configured to detect possible collisions of the motor vehicle with other roadside mobile objects, such as cyclists.

A system of this kind offers the advantage of increasing traffic safety. As such the system is generally configured such that a warning of a possible collision of the motor vehicle with an object or respective safety-related actions can be initiated even if the object such as a pedestrian is still outside the immediate surrounding area of the motor vehicle, in particular outside the physical path of the motor vehicle, but where the predictive trajectories of the motor vehicle and the object are on a collision course or if a calibrated safety distance has been violated. Since the monitored movement range of the motor vehicle is dynamically adapted, it is possible to react in sufficient time to a possible collision thereby avoiding or mitigating accidents. In comparison to a system which calculates probabilities of a possible collision, the system is designed in a simple manner and can be realized using known components and functions of a normal motor vehicle or implemented in a simple manner without a great deal of expense and without necessitating costly and expensive conversions.

The control unit is configured to enlarge the driving envelope of the motor vehicle by a first safety space adjacent thereto, a second safety space laterally adjacent to the first safety space and an approach space laterally adjacent to the second safety space. The first safety space may, for example, be chosen such that a width of the first safety space corresponds to a minimum distance, which an attentive driver of the motor vehicle would normally maintain from an object, in particular a pedestrian. The second safety space can be chosen such that the width of the second safety space corresponds to a minimum distance, which the object, in particular a pedestrian, would normally maintain from an approaching motor vehicle. The approach space may correspond to the zone of the object, in particular a pedestrian, which is characterized in that the object, in particular the pedestrian, reduces speed looking out for approaching motor vehicles or prepares himself for stopping by the side of the road, for example. The driving envelope of the motor vehicle can thus be enlarged by the control unit such that apart from the physical width of the motor vehicle the driving envelope also covers three safety zones around the driving path of the motor vehicle in such a way that all surrounding areas of the motor vehicle relevant for a possible collision are monitored. The system is thus configured to react appropriately even before an object, in particular a pedestrian, has reached the driving path of the motor vehicle, thus permitting a further improvement of the efficiency of the system. Further the control unit may be configured to enlarge the driving envelope even further to include more than three zones.

The system may include a sensor or first means for detecting a vehicle speed and a sensor or second means for detecting vehicle acceleration. Further the vehicle parameters may be a current vehicle speed and/or current vehicle acceleration. Therefore the monitored driving path of the motor vehicle may be configured based on operating variables of the motor vehicle, in particular a vehicle speed and/or a vehicle acceleration, such that the driving envelope, depending on a current vehicle speed and/or a current vehicle acceleration, is respectively chosen to be of a size allowing the system to react in good time. In other words, the system can initiate a warning of a possible collision of a motor vehicle with an object and initiate appropriate safety-related actions, even if the object, in particular a pedestrian, is not yet in the immediate surrounding area of the motor vehicle or in the physical collision path of the motor vehicle.

When confronted with a sudden dangerous situation the actual driving speed of the motor vehicle plays an important part because vehicles cannot be abruptly stopped or diverted but need a certain stopping path composed of the reaction distance and the braking or turning distance. Speedometers and accelerometers for detecting a vehicle speed and/or a vehicle acceleration of normal motor vehicles are known allowing them to be realized in a simple manner and without a great deal of expense by components and functions already known for normal motor vehicles, and without costly and cumbersome conversions being necessary. The first means for detecting the vehicle speed may be, for example, an engine control of a normal vehicle. Further, the first means for detecting a vehicle speed may be any further unit of a normal motor vehicle, which is configured to determine a current speed of the motor vehicle, for example a tachometer or odometer pulse generator. The second means for detecting vehicle acceleration may be an acceleration sensor, for example. Further, the second means for detecting vehicle acceleration may be any further unit of a normal motor vehicle, which is configured to determine a current acceleration.

Further the system may include a sensor or third means for detecting a speed of the object, a sensor or fourth means for detecting an environmental brightness, a sensor or fifth means for detecting a road surface and a sensor or sixth means for detecting positional information. The environmental parameters may be a current speed of the object, a current environmental brightness, a current road surface and/or positional information of the vehicle, object or relative positional information therebetween.

As such, apart from the vehicle parameters, the system may utilize further vehicle-independent parameters, which could be relevant for warning of a possible collision of a motor vehicle, and therefore the monitored surrounding area of the motor vehicle can be adapted accordingly. For example, the point in time of an estimated collision of a motor vehicle with an object and therefore the time period which is available after detecting a possible collision of a motor vehicle with an object for initiating safety-related actions is dependent, apart from vehicle speed, also from the speed of the moving object.

A further parameter which has influence upon this time period is the environmental brightness. After all, the visibility for a driver of the motor vehicle or for a pedestrian, in particular on unlit or poorly lit road sections, is distinctly diminished at night than during the day, which means that a possible collision may be realized distinctly later and reaction delayed accordingly. Further, tires of the motor vehicle on a slippery roadway grip and may skid along the roadway, neither the speed nor the driving direction of the motor vehicle can be reliably specified so that the necessary time period for initiating safety-related actions for avoiding a possible collision of a motor vehicle with an object must be accordingly increased. The positional information may, for example, be a type of road. As such the probability of such a collision, in particular with a pedestrian, on highway or main roads is distinctly less than on surface streets or secondary road. The means for detecting a speed of the object may be sensors in the motor vehicle and associated control units, which are configured to calculate the position of the object over time, in order to calculate speed values therefrom. The means for detecting an environmental brightness may be, for example, an external sensor which is configured to detect an environmental brightness. The means for detecting a road surface and the means for detecting positional information may be further realized by camera systems arranged in the motor vehicle. The means for detecting positional information may be a control unit of the motor vehicle which is configured to evaluate map material, in particular digital map material from a navigational system or the like.

According to one embodiment the control unit includes a first evaluation unit which is configured to set a width of the first safety space and a width of the second safety space to a value which is the larger of 30 cm and a value in cm which is proportional to the current vehicle speed in km/h. For example, the width of the first and the second safety space can be set to respectively 30 cm for a vehicle speed of 30 km/h or less, and to 50 cm for a vehicle speed of 50 km/h. According to a further embodiment the first evaluation unit may be configured to set the width of the first safety space and the width of the second safety space to a value which is constant for certain speed intervals of the vehicle speed and which is greater than or equal to 30 cm. Therefore, the first evaluation unit may be configured to set the width of the first and second safety spaces to a value of 30 cm in the range of a vehicle speed of 0 to 30 km/h and to 50 cm in the range for vehicle speeds between 30 and 50 km/h. Alternately, the first evaluation unit may be configured to control the width of the first and second safety space via a non-linear function of the vehicle speed, for example via an exponential function.

Overall, such realizations of the first and second safety space will allow a driving path of the motor vehicle to be enlarged by speed-dependent safety zones in such a way that safety-related actions can be initiated before the object is in the collision path of the motor vehicle in order to avoid or mitigate an impending collision, thereby maximizing system efficiency. The lower threshold of 30 cm serves to ensure maximum system efficiency by selecting a width for the first and second safety space which is large enough for the motor vehicle to realize a sufficiently early reaction to avoid collision with an object, even if the object is not yet in the physical collision path of the motor vehicle. Further the first evaluation unit in this case may include a first selection unit by means of which a driver of the motor vehicle can choose a particular safety zone model for controlling the width of the first and second safety space. Based on such a safety zone model selection the system, in particular the width of the first and second safety space, can be adapted to the actual situation, i.e. the current environment of the motor vehicle, thus allowing the number of unnecessary activations of safety-related actions to be further minimized.

Moreover the control unit may include a second evaluation unit which is configured to adapt a width of the approach space as a function of a current speed of the object. Because the approach space is also designed so as to be speed-dependent, the system is configured to permit sufficient reaction time, in particular to initiate safety-related actions, also in a situation where the object, in particular a pedestrian, is outside a safety distance around the motor vehicle calibrated by the first and second safety space, but could enter or at least approach this space. Further in this zone, orientation of the object, i.e. the pedestrian, and his or her viewing direction, may be used to conduct an intention and attention recognition, i.e. to register, whether this pedestrian could enter or at least approach, the physical collision path of the motor vehicle. This function can be realized, for example, by a camera system with associated control units arranged on the motor vehicle, or by an optical tracking system. The added advantage would be that a number of unnecessary activations of safety-related actions by the system can be further minimized, whilst simultaneously maximizing system efficiency, in particular protection of pedestrians.

According to one embodiment the second evaluation unit can be configured so as to set the width of the approach space to a value in cm, the amount of which corresponds to ten times the current speed of the object in km/h. Therefore the width of the approach space can be set to 50 cm, for example, if the object is a pedestrian who walks at a speed of 5 km/h. According to one embodiment the second evaluation unit can also be configured so as to set the width of the approach space to a value which is constant for all speeds of the object. For example, the second evaluation unit may be configured to set the width of the approach space to a value of 50 cm, respectively. Again the second evaluation unit can include a second selection unit that the driver of a motor vehicle can use to choose which of these safety zone models he or she wants to control the width of the approach space. Based on such a safety zone model selection the system, in particular the width of the approach space can be adapted to the actual situation, i.e. the current environment of the motor vehicle, thus allowing the number of unnecessary activations of safety-related actions to be further minimized.

The control unit can also include a third evaluation unit configured to reduce the width of the first safety space, the width of the second safety space or the width of the approach space by a fixed value, in case a sidewalk was detected within the respective zone. A sidewalk is part of a traffic area of a road, which as a rule is separated from a roadway by a curb and/or a grass verge or parkway that runs parallel to the road, and is provided for pedestrians. In order to further minimize the number of unnecessary activations of safety-related actions by the system, the system may be configured using the third evaluation unit such that sidewalks usually frequented by pedestrians are also taken into account when dynamically adapting the driving envelope of the motor vehicle. For example, if a sidewalk is detected, the widths of the zones may be reduced by 20 cm, provided the chosen value for the width can never be lower than 30 cm. The third evaluation unit may be configured to reduce the respective zone only on that side of the motor vehicle on which the curb was detected so that the widths of individual zones on opposite sides of the vehicle may include different values.

Further the control unit may include a fourth evaluation unit configured to adapt the width of the first safety space, the width of the second safety space and the width of the approach space respectively as a function of the environmental brightness. The environmental brightness constitutes a further parameter when dynamically adapting the driving envelope of the motor vehicle since the visibility for a driver of the motor vehicle or for an object such as a pedestrian, in particular on unlit or poorly lit road sections, is distinctly reduced at night than during the day, which means that these would realize a possible collision distinctly later and would react accordingly. Therefore individual zones, i.e. the first safety space, the second safety space and the approach space, are correspondingly enlarged at night.

Further the warning unit may be coupled with a braking unit of the motor vehicle and may also be configured to generate a safety-related action, i.e. a signal for braking the motor vehicle. The system can thus be advantageously designed so as to initiate automatic braking of the motor vehicle in order to avoid a collision, wherein a braking system of the motor vehicle is automatically controlled such that braking can be initiated in sufficient time even if the object, in particular the pedestrian, is not yet in the physical collision path of the motor vehicle. Alternately, the system may be configured to initiate further or additional safety-related actions in case an object is detected within the dynamically adapted driving envelope of the motor vehicle, and this can be affected in form of an acoustic or optical warning for a driver of the motor vehicle.

The warning unit may include a first triggering means configured to initiate a safety-related action in form of a system reaction noticeable for the driver of the motor vehicle in case an object has been detected within the first safety space. As such the first safety space corresponds to the space which has a width corresponding to a calibrated minimum distance which would be maintained by an attentive driver of the motor vehicle from an object, in particular a pedestrian. Therefore, it can be assumed that such a system reaction would be accepted by the driver of the motor vehicle so that traffic safety can be increased without the driver having to accept comfort losses. The noticeable system reaction may for example be a noticeable braking of the motor vehicle.

Moreover the warning unit may include a second triggering means which is configured to initiate a safety-related action in the form of a system reaction not noticeable for the driver of the motor vehicle in case an object has been detected within the second safety space. Since the second space corresponds to the space which includes a width corresponding to a minimum distance which would normally be maintained by an object, in particular a pedestrian, from an approaching vehicle, it can be ensured that this distance is maintained and that possible collisions of the motor vehicle with the object are avoided without the driver of the motor vehicle having to accept noticeable comfort losses. The not-noticeable system reaction may for example be the so-called prefill function, wherein a prefilling of the wheel brakes with low pressure is affected before the driver actively operates the brake pedal. This prefill function is normally intended to overcome the play prior to braking, resulting in the brake pad touching the brake disc prior to the driver actually operating the brake pedal, in order not to lose time for the stroke of the brake and thus for the building up of effective braking power.

Further the sensors may include means for detecting a movement of the object over time, and the warning unit may include a third triggering means, wherein the third triggering means is configured to initiate a not-noticeable system reaction for the driver of the motor vehicle in case the object has been detected within the approach space and the object is moving towards the second safety space. This is advantageous in case an object, in particular a pedestrian, does not behave normally, i.e. does not correspond to a behavior which for example points to the pedestrian stopping. The not-noticeable system reaction may, for example, be again the prefill function. The means for detecting a movement of the object over time may be, for example, a camera system arranged in the motor vehicle.

In conclusion it can be stated that the present disclosure proposes a system with which traffic safety can be increased. As such possible collisions between a motor vehicle and an object, in particular a pedestrian, can be mitigated or avoided, since the system, due to dynamically adapting a monitored surrounding area of the motor vehicle, is configured to react in sufficient time and to initiate safety-related actions even although the object is not yet in the physical collision path.

Since the monitored surrounding area, apart from a driving path of the motor vehicle, also encompasses a second safety space enlarging the first safety space as well as an approach space, wherein the width of the individual zones can be selected in particular independently of speed, system efficiency, i.e. in particular pedestrian protection, can be further maximized for simultaneous minimization of a number of unnecessary activations of safety-related actions.

BRIEF DESCRIPTION OF THE DRAWINGS

The present disclosure will now be described in detail with reference to the attached figures. The present disclosure will hereinafter be described in conjunction with the following drawing figures, wherein like numerals denote like elements.

FIG. 2 shows a flow diagram for illustrating how a warning of a possible collision of the motor vehicle with an object is executed according to embodiments of the present disclosure.

DETAILED DESCRIPTION

Figure 1:
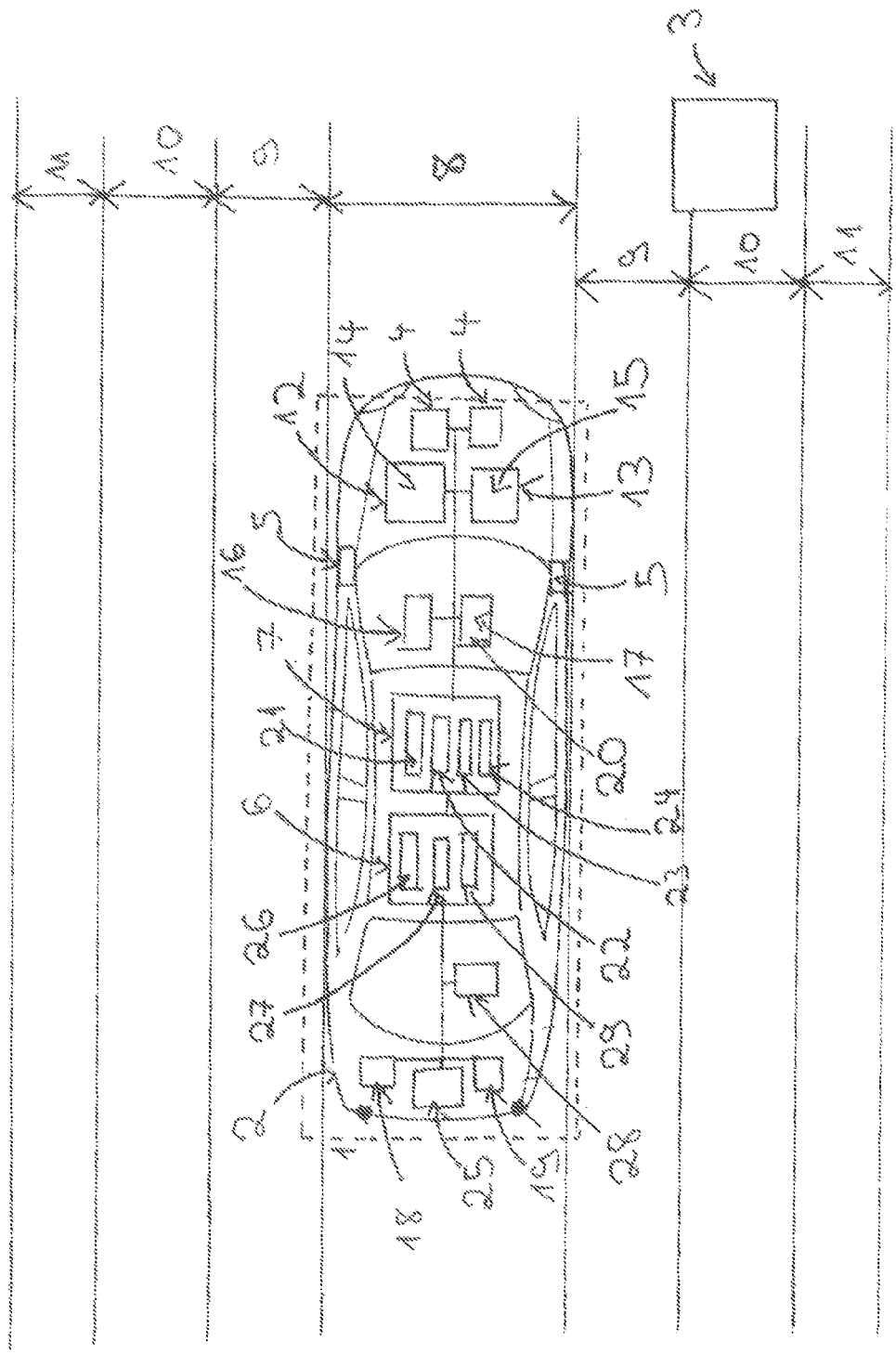
FIG. 1 shows a schematic block diagram of a system for warning of a possible collision of a motor vehicle with an object according to embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows a schematic block diagram of an active safety driver assistance system 1 for warning of a possible collision of a motor vehicle 2 with an object 3. The system 1 serves to predict potential collisions of a motor vehicle 2 with an object 3, i.e. other traffic participants and to initiate safety-related actions. The object 3 depicted in FIG. 1 is a pedestrian.

Active safety driver assistance systems of this kind serve to react in sufficient time to unprotected traffic participants such as pedestrians and cyclists. To this end, sensors 4 are provided which monitor a driving path of the motor vehicle. There are sensors 4 provided to cover and monitor a frontal area of the environment of the motor vehicle 2, and sensors 5 provided to cover and monitor a lateral area including a dead angle area of the environment of the motor vehicle 2. The sensors 4 preferably include short-range radar with frontal detection area, long-range radar with frontal detection area as well as a camera with frontal detection area. The further sensors 5 preferably include lateral radar with lateral detection area. A warning unit 6 serves to initiate a safety-related action in case an object 3 has been detected within a monitored driving path.

As shown in FIG. 1, the system 1 further includes a control unit 7 for dynamically adapting driving envelope as a function of vehicle parameters and/or environmental parameters. The reaction range of the system can thus be adapted, i.e. enlarged in particular beyond a physical vehicle width thereby configuring the system 1 in such a way that it can react in sufficient time to possible collisions, even although the object 3, in particular the pedestrian, is not yet in the physical collision path of the motor vehicle 2.

As can be seen in FIG. 1 the control unit is configured to enlarge a driving envelope 8 about a first safety space 9 laterally adjacent thereto, a second safety space 10 laterally adjacent to the first safety space 9 and an approach space 11 laterally adjacent to the second safety space 10. The first safety space 9 is chosen such that a width of the first safety space 9 corresponds to a minimum distance which an attentive driver of the motor vehicle 2 would normally maintain from the object 3, in particular a pedestrian. The second safety space 10 is chosen such that a width of the second safety space 10 corresponds to a minimum distance which the object, in particular a pedestrian would normally maintain from an approaching vehicle 2. The approach space 11 further corresponds to the zone of the object 3, in particular a pedestrian, which is characterized in that the object 3, in particular a pedestrian, slows down looking around and is preparing to stop at the edge of the road. Further the control unit may be configured to enlarge the driving envelope by further zones and thus by more than three zone.

Further FIG. 1 shows a sensor or first means 12 for detecting vehicle speed as well as a sensor or second means 13 for detecting vehicle acceleration. The vehicle parameters according to the embodiments of FIG. 1 include a current vehicle speed and/or current vehicle acceleration. The first means 12 shown in FIG. 1 for detecting a vehicle speed is a motor control 14 of the motor vehicle 2. Further the first means 12 for detecting the vehicle speed can be any further unit of the motor vehicle 2, which is configured to determine a current speed of the motor vehicle 2 such as a tachometer or odometer pulse generator. The second means 13 for detecting the vehicle acceleration is an acceleration sensor 15. Further the second means 13 for detecting the vehicle acceleration can be any further unit of the motor vehicle 2, which is configured to determine a current acceleration.

Further the system 1 according to FIG. 1 includes a sensor or third means 16 for detecting a speed of the object, a sensor or fourth means 17 for detecting an environmental brightness, a sensor or fifth means 18 for detecting a road surface and a sensor or sixth means 19 for detecting positional information. According to the embodiments of FIG. 1 the environmental parameters include a current speed of the object, a current environmental brightness, a current road surface and/or positional information. Positional information may for example be a type of road, i.e. the type of road on which the vehicle is currently travelling such as a freeway or limited access road, a primary or main road or a secondary road or surface street. The third means 16 for detecting a speed of the object 3 of FIG. 1 are sensors in the motor vehicle 2 not shown in FIG. 1 as well as associated control units which are configured to detect the position of the object over time thus allowing speed values to be calculated. The fourth means 17 for detecting an environmental brightness is again an external sensor 20 which is configured to detect an environmental brightness. The shown fifth means 18 for detecting a road surface as well as the shown sixth means 19 for detecting positional information are realized, according to FIG. 1, by camera systems arranged in the motor vehicle but not shown in FIG. 1. Further the shown sixth means 19 for detecting positional information may, alternatively, be a control unit of the motor vehicle which is configured to evaluate map material, in particular digital map material.

According to the embodiments of FIG. 1 the control unit 7 includes a first evaluation unit 21 configured to set a width of the first safety space 9 and a width of the second safety space 10 to a maximum value based on a predetermined minimum value, (e.g., 30 cm) and a value proportional to a current vehicle speed (e.g., 1 cm per km/h). Therefore the widths of the first and the second safety spaces 9 and 10 can be set to respectively 30 cm for a vehicle speed of 30 km/h or less as well as for example to 50 cm for a vehicle speed of 50 km/h.

Further the first evaluation unit 21 may alternatively be configured to set the width of the first safety space 9 and the width of the second safety space 10 to a value which is constant for certain speed intervals of the vehicle speed, which value is greater than or equal to 30 cm. Further the first evaluation unit 21 may also include a first selection unit by means of which the driver of the motor vehicle 2 can choose the safety zone model he or she wants to control the width of the first and second safety space 9, 10. The lower threshold of 30 cm serves to ensure perfect system efficiency, i.e. reacting in good time and initiating safety-related actions for avoiding a possible collision of the motor vehicle 2 with the object 3, even if the object 3, in particular a pedestrian, is not yet in the physical collision path.

Further the control unit 7 shown includes a second evaluation unit 22 which is configured to adapt a width of the approach space 11 as a function of a current speed of the object 3. According to the embodiments of FIG. 1 the second evaluation unit 22 is configured to set the width of the approach space 11 to a value in cm, the amount of which corresponds to ten times the amount of the current speed of the object 3. Therefore the width of the approach space 11 can be set, for example, to 50 cm in case the object 3 is a pedestrian who is moving at a speed of 5 km/h. Further the second evaluation unit 22 may alternatively be configured to set the width of the approach space 11 to a value which is constant for all speeds of the object 3. The second evaluation unit 22 may again include a second selection unit which a driver of the motor vehicle can choose the safety zone model he or she wants to control the width of the approach space.

It can further be recognized that the control unit 7 includes a third evaluation unit 23 configured to reduce the width of the first safety space 9, the width of the second safety space 10 and/or the width of the approach 11 by a fixed value in case a sidewalk is detected within the respective zone, i.e. within the width of the first safety space 9, the width of the second safety space 10 or the width of the approach space 11. In particular, the third evaluation unit 23 is configured to reduce the respective zone by 20 cm, but not to a value below 30 cm.

The control unit 7 also includes a fourth evaluation unit 24 configured to adapt the width of the first safety space 9, the width of the second safety space 10 and the width of the approach space 11 as a function of the environmental brightness, respectively. In particular the fourth evaluation unit 24 is configured to enlarge the individual zones at night when lighting conditions are worse than during daylight.

According to FIG. 1 the warning unit 6 is further coupled with a braking unit 25 of the motor vehicle 2. Further the warning unit 6 is configured to generate a safety-related action, i.e. a signal for braking the motor vehicle 2. Further the warning unit 6 may be configured to initiate other or additional safety-related actions, for example in the form of an acoustic or optical warning for the driver of the motor vehicle 2. To this end the warning unit 6 shown includes a first triggering means 26 configured to initiate a safety-related action, i.e. a system reaction which is noticeable for the driver of the motor vehicle 2, in case an object 3 has been detected within the first safety space 9, i.e. within a distance which a driver of the motor vehicle 2 would normally maintain from the object 3. The noticeable system reaction according to FIG. 1 is a noticeable braking of the motor vehicle 2. Moreover, the warning unit 6 includes a second triggering means 27 configured to initiate a safety-related action, i.e. a system reaction which is not noticeable for the driver of the motor vehicle 2, in case an object 3 has been detected within the second safety space 10, i.e. within a distance which the object 3, in particular a pedestrian, would normally maintain from an approaching vehicle 2. The not-noticeable system reaction, according to embodiments of FIG. 1, is the prefill function. The prefill-function is understood to mean the prefilling of wheel brakes with low pressure before the driver actively operates the brake pedal. This function is intended to overcome the play prior to braking resulting in the brake pad touching the brake disc prior to the driver actually operating the brake pedal, in order to lose less time for the stroke of the brake and thus for the building up of effective braking power.

Further the sensors include means 28 for detecting a movement of the object over time. In addition the shown warning unit 6 includes a third triggering means 29 which is configured to initiate a not-noticeable system reaction for the driver of the motor vehicle 2, in case the object 3 has been detected within the approach space 11 and is moving towards the second safety safe 10, i.e. it was detected that the object 3, in particular a pedestrian, does not behave normally, i.e. does not show, for example, a behavior which indicates that he is going to stop.

FIG. 2 shows a flow diagram for illustrating how a warning of a possible collision of the motor vehicle with an object is executed according to embodiments of the present disclosure. As shown in FIG. 2 a method 30 for warning of a possible collision of a motor vehicle with an object according to embodiments of the present disclosure includes the following steps. In step 31 a driving envelope of the vehicle is initially dynamically adapted as a function of vehicle and/or environmental parameters. In step 32 the dynamically adapted driving envelope is monitored. In a further step 33 a safety-related action is initiated when an object has been detected within the dynamically adapted driving envelope.

In step 32, when no object has been detected within the dynamically adapted driving envelope, steps 31 and 32 are repeatedly carried out. But when in step 32 an object is detected within the dynamically adapted driving envelope, a safety-related action is initiated in the following step 33.

According to the embodiments of FIG. 2, step 31 of dynamically adapting the driving envelope of the motor vehicle includes enlarging the driving path by a first safety space laterally adjacent thereto, a second safety space laterally adjacent to the first safety space and an approach space laterally adjacent to the second safety space. The first safety space is chosen such that a width of the first safety space corresponds to a minimum distance which an attentive driver of the motor vehicle would normally maintain from an object, in particular a pedestrian. The second safety space again is chosen such that a width of the second safety space would correspond to a minimum distance which the object, in particular a pedestrian, would normally maintain from an approaching vehicle. The approach space further corresponds to the zone of the object, in particular the pedestrian, which is characterized in that the object, in particular the pedestrian, slows down and prepares to stop at the edge of the road. It is also possible to enlarge the driving path by adding further zones so that it includes more than three zones.

According to the embodiments of FIG. 2, the vehicle parameters include vehicle speed and/or vehicle acceleration. The environmental parameters include a speed of the object, an environmental brightness, a road surface and/or positional information. Positional information is understood to mean the type of road on which the motor vehicle is currently travelling such as a freeway or limited access road, a primary or main road or a secondary road or surface street. According to the embodiments of FIG. 2 dynamically adapting the driving envelope of the motor vehicle is affected in a speed-dependent manner.

According to the embodiments of FIG. 2 a width of the first safety space and a width of the second safety space are respectively set to a value in cm, the amount of which corresponds to an amount of the current vehicle speed. However this value is never less than 30 cm. Therefore the width of the first 9 and the second safety space 10 can be respectively set to 30 cm for a vehicle speed of 30 km/h or less as well as e.g. to 50 cm for a vehicle speed of 50 km/h. Alternately, the width of the first safety space and the width of the second safety space can be set to a value which is constant for certain speed intervals of the vehicle speed, but again never less than 30 cm. The lower threshold of 30 cm again serves to ensure system efficiency.

Also according to the method a width of the approach space is adapted as a function of the speed of the object. According to the embodiments of FIG. 2, the width of the approach space is set to a value in cm which corresponds to ten times an amount of a current speed of the object in km/h. Therefore the width of the approach space 11 can e.g. be set to 50 cm in case the object 3 is a pedestrian who is moving at a speed of 5 km/h.

Further the width of the approach space can be set alternatively to a fixed value. According to the embodiments of FIG. 2 the width of the first safety space, the width of the second safety space and the width of the approach space can be reduced by a fixed value, in case a sidewalk was respectively detected in step 32 within the first safety space, the second safety space or the approach space, i.e. within the corresponding zones. In particular, the respective widths can be reduced by 20 cm, but never to a value less than 30 cm.

Also according to the method, the widths of the first safety space, the second safety space and the approach space are respectively adapted as a function of the environmental brightness. In particular the individual zones can be enlarged at night, i.e. when the light conditions are worse compared to daylight.

The safety-related action according to FIG. 2 is a braking of the motor vehicle. In step 33 a system reaction noticeable for a driver of the motor vehicle is triggered in case an object has been detected within the first safety space, i.e. within a minimum distance which a driver of the motor vehicle would normally maintain from an object, in particular a pedestrian. The noticeable system reaction according to FIG. 2 is understood to be a braking of the motor vehicle.

Further, according to the embodiments of FIG. 2, in step 33 a system reaction not noticeable for a driver is initiated in case an object has been detected within the second safety space, i.e. within a minimum distance, which an object, in particular a pedestrian, would normally maintain from an approaching motor vehicle. According to the embodiments of FIG. 2 the not-noticeable system reaction is again the prefill function. The prefill function is understood to mean the prefilling of the wheel brakes with low pressure before the driver operates the brake pedal. This function is intended to overcome the play prior to braking so that the brake pads touch the brake discs prior to the driver operating the brake pedal, in order to lose less time during braking for the stroke of the brake and thus for the building-up of effective braking power.

Further a viewing direction and/or a behavior of the object, in particular a pedestrian, is initiated over a certain time, and in step 33, system reactions not noticeable for the driver are initiated in case an object has been detected within the approach space, which moves towards the second safety space, i.e. in case it is detected that the object, in particular a pedestrian, does not behave normally, i.e. does not correspond to a behavior which indicates stopping. The not-noticeable system reaction is again the prefill function.

A warning of a possible collision of a motor vehicle with an object is generated by the system using the method which can be executed in combination with the previously mentioned general method. In accordance with the present disclosure, a method for warning of a possible collision of a motor vehicle with an object includes (i) dynamically adapting a driving envelope of the motor vehicle as a function of vehicle and/or environmental parameters; monitoring the dynamically adapted driving envelope for an object therein; and initiating a safety-related action when the object has been detected within the dynamically adapted driving envelope. The vehicle parameters may include a current vehicle speed and/or current vehicle acceleration. The environmental parameters may include a current speed of the object, an environmental brightness, a road surface and/or positional information.

The method may further include enlarging the driving envelope by a first safety space laterally adjacent thereto, a second safety space laterally adjacent to the first safety space and an approach space laterally adjacent to the second safety space. A width of the first safety space and a width of the second safety space are respectively set to a value in cm, the amount of which corresponds to an amount of the current vehicle speed in km/h, but is never set to a value smaller than a threshold value (e.g. 30 cm). Alternately, the width of the first safety space and of the second safety space may is respectively set to value which is constant for certain speed intervals of the vehicle speed, but is never set to a value smaller than the threshold value (e.g., 30 cm). A width of the approach space may also be adapted as a function of a current speed of the object. For example, the width of the approach space may be set to a value in cm the amount of which corresponds to ten times an amount of the current speed of the object in km/h.

Alternately, the width of the approach space is set to a fixed value. The width of the first safety space, the width of the second safety space or the width of the approach space may also be respectively adapted based on various environmental parameters. For example, the width of the first safety space, the width of the second safety space or the width of the approach space may be reduced by a fixed value when a sidewalk has been detected within the first safety space, the second safety space or the approach space. The widths of the first safety space, the second safety space and the approach space may be adapted as a function of the environmental brightness.

The safety-related action may include a braking of the motor vehicle. In which case initiation of a safety-related action includes triggering a system reaction noticeable for a driver of the motor vehicle, when the object has been detected within the first safety space. Alternately, initiation of a safety-related action may include triggering a system reaction not noticeable for a driver of the motor vehicle, when the object has been detected within the second safety space.

A viewing direction and/or a behavior of the object may also be detected over a certain time such that initiation of a safety-related action includes triggering a system reaction not noticeable for the driver, when the object detected within the approach space is moving towards the second safety space.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A collision warning system for a motor vehicle comprising:
    at least one sensor configured to monitor a driving path of the motor vehicle for an object within the driving path;
    a control unit configured to define a driving envelope having a first safety space adjacent to the motor vehicle, a second safety space adjacent the first safety space and an approach space adjacent to the second safety space; and dynamically adapt at least one of the first and second safety spaces as a function of a vehicle parameter or an environmental parameter, wherein the control unit includes a first evaluation unit configured to set a first width of the first safety space and a second width of the second safety space to a value which is dependent on the current vehicle speed, wherein the value is not less than a threshold value;
    a first sensor configured to detect a current vehicle speed and a second sensor configured to detect a current vehicle acceleration, wherein the vehicle parameter includes at least one of the current vehicle speed and the current vehicle acceleration; and
    a warning unit configured to initiate a safety-related action when the object is detected within the driving envelope, wherein the safety-related action is a function of the object being in the first safety space or the second safety space.

2. The system according to claim 1, wherein control unit comprises a second evaluation unit configured to set a value of the width of the approach space to a predetermined value.

3. The system according to claim 2, further comprising:
   a third sensor configured to detect a current speed of the object; and
   wherein the second evaluation unit is configured to set the value for the width of the approach space dependent on the current speed of the object.

4. The system according to claim 1, wherein the first evaluation unit is configured to set the first width of the first safety space and the second width of the second safety space to a value which is constant for a given speed interval of the vehicle speed, and the value is not less than a threshold value.

5. The system according to claim 1 further comprising at least one of a third sensor configured to detect a current speed of the object, a fourth sensor configured to detect a current environmental brightness, a fifth sensor configured to detect a current road surface and a sixth sensor configured to detect current positional information, wherein the environmental parameter include at least one of the current speed of the object, the current environmental brightness, the current road surface and the current positional information.

6. The system according to claim 5, wherein the control unit further comprises a third evaluation unit configured to reduce at least one of the width of the first safety space, the width of the second safety space and the width of the approach space by a fixed value when the sixth sensor indicates a sidewalk is within at least one of the first safety space, the second safety space or the approach space.

7. The system according to claim 5, wherein the control unit comprises a fourth evaluation unit configured to adapt the width of at least one of the first safety space, the width of the second safety space and the width of the approach space dependent on the environmental brightness detected by the fourth sensor.

8. The system according to claim 1, wherein the warning unit is operably coupled with a braking unit of the motor vehicle and is configured to generate a braking signal for the braking unit.

9. The system according to claim 1, wherein the warning unit comprises a first trigger configured to initiate at least one of a system reaction noticeable for a driver of the motor vehicle when the object is detected within the first safety space and a system reaction not noticeable for a driver of the motor vehicle when the object is detected within the second safety space.

10. The system according to claim 9, wherein the warning unit further comprises a second trigger, wherein the first trigger is configured to initiate the system reaction noticeable for a driver of the motor vehicle when the object is detected within the first safety space and the second trigger is configured to initiate the system reaction not noticeable for a driver of the motor vehicle when the object is detected within the second safety space.

11. The system according to claim 10, wherein the system further comprises:
    a sensor configured to detect a direction of movement of the object; and
    a third trigger associated with the warning unit and configured to initiate a system reaction not noticeable for the driver of the motor vehicle when the object is detected within the approach space and is moving in a direction towards the second safety space.

* * * * *